US011687929B2

(12) United States Patent
Mardikar

(10) Patent No.: US 11,687,929 B2
(45) Date of Patent: Jun. 27, 2023

(54) AUTHENTICATED SECURE ONLINE AND OFFLINE TRANSACTIONS

(71) Applicant: American Express Travel Related Services Co., Inc., New York, NY (US)

(72) Inventor: Upendra Mardikar, San Jose, CA (US)

(73) Assignee: American Express Travel Related Services Co., Inc., New York, NY (US)

( * ) Notice: Subject to any disclaimer, the term of this patent is extended or adjusted under 35 U.S.C. 154(b) by 249 days.

(21) Appl. No.: 15/934,274

(22) Filed: Mar. 23, 2018

(65) Prior Publication Data
US 2019/0295077 A1 Sep. 26, 2019

(51) Int. Cl.
*G06Q 20/40* (2012.01)
*H04L 9/40* (2022.01)

(52) U.S. Cl.
CPC ......... *G06Q 20/401* (2013.01); *H04L 63/083* (2013.01)

(58) Field of Classification Search
CPC ...... G06Q 20/00; G06Q 20/367; G06Q 20/38; G06Q 20/3672; G06Q 20/3821
See application file for complete search history.

(56) References Cited

U.S. PATENT DOCUMENTS

| 4,523,087 A * | 6/1985 | Benton | G06Q 20/341 235/379 |
| 10,049,360 B2 * | 8/2018 | Hammad | G06Q 20/40 705/75 |
| 2008/0126036 A1 * | 5/2008 | Al-Hamwy | G06Q 10/10 703/6 |
| 2008/0243702 A1 * | 10/2008 | Hart | H04L 9/3234 705/69 |
| 2010/0235284 A1 * | 9/2010 | Moore | G06Q 20/40 705/75 |

(Continued)

FOREIGN PATENT DOCUMENTS

CA 2482558 * 6/2013

OTHER PUBLICATIONS

Weber, Ricarda; Digital Payment Systems, Institute for Information, Munich Technical University, Aug. 1998 (Year: 1998).*

(Continued)

*Primary Examiner* — Jacob C. Coppola
*Assistant Examiner* — Terry Nathan Murray
(74) *Attorney, Agent, or Firm* — Thomas | Horstemeyer, LLP

(57) ABSTRACT

A system for customer defined limited use authorization. The system may receive an identification credential from at least one of an issuer native app or an issuer web app and receive a customer data. The system may determine a valid customer identity in response to the receiving the identification credentials and the customer data. The system may receive a request to generate a token from at least one of the issuer web app or the issuer native app, wherein the request comprises at least one of the identification credential or a parent transaction account, and wherein the request comprises at least one of a customer defined authorization control or a customer defined generation control.

19 Claims, 3 Drawing Sheets

(56) References Cited

U.S. PATENT DOCUMENTS

| | | | | |
|---|---|---|---|---|
| 2013/0091559 | A1* | 4/2013 | Thun | G06F 21/43 |
| | | | | 726/9 |
| 2014/0162692 | A1* | 6/2014 | Li | H04L 67/306 |
| | | | | 455/456.3 |
| 2015/0312111 | A1* | 10/2015 | Blanco | H04L 47/70 |
| | | | | 709/224 |
| 2015/0372811 | A1* | 12/2015 | Le Saint | G06F 1/163 |
| 2016/0099924 | A1* | 4/2016 | Mehta | H04L 61/1552 |
| | | | | 726/7 |
| 2017/0063840 | A1* | 3/2017 | Krishnaiah | H04L 63/0815 |
| 2017/0091721 | A1* | 3/2017 | Ronca | G06Q 20/4014 |
| 2017/0132633 | A1* | 5/2017 | Whitehouse | G06Q 20/4014 |
| 2017/0270557 | A1* | 9/2017 | Maenpaa | G06Q 20/327 |
| 2017/0316405 | A1* | 11/2017 | Lonni | G06Q 20/382 |
| 2018/0239976 | A1* | 8/2018 | Cornelius | G06F 1/163 |
| 2019/0147477 | A1* | 5/2019 | Nazarows | G06Q 30/0226 |
| | | | | 705/14.27 |

OTHER PUBLICATIONS

Larathy, Kevin, Machine Translation JP2016510468, Transaction Token Issuer; (Year: 2014).*

International Search Report and Written Opinion dated Apr. 12, 2019 in PCT/US2019/012841.

* cited by examiner

AUTHENTICATED SECURE ONLINE AND OFFLINE TRANSACTIONS

FIELD

The present disclosure generally relates to providing identification security for online and offline transactions, and more particularly, to providing customer defined limited use identification for secure transactions.

BACKGROUND

Payment networks include various systems for processing transactions between merchants and customers. Merchants are members of the payment network and the merchants may be authorized to charge to customer accounts. Customers have a transaction account with the payment network. To complete a transaction, a merchant typically transmits a payment request (or settlement) to the payment network with transaction details and the customer account information. Generally a customer may authorize a payment by providing a Primary Account Number (PAN) or, in other words, a card number. Because a customer PAN may be reused to authorize any number of transactions, a typical security attack involves capturing and authorizing a customer's PAN to avoid fraudulent transactions.

Fraud occurring during transactions cost consumers, merchants, issuers, and other parties billions of dollars a year. Systems (and third parties supported by the payment network) are incorporated to detect and report fraud, but such extra safeguards may further increase costs associated with security and infrastructure. Additionally, reports of known fraud or suspected fraud may not occur in real time. Such delays at least partially reduce the ability of the payment network to accurately and quickly detect fraud as transactions are processed and before the transaction is completed. It is therefore desirable to provide a limited use identifier for transactions, i.e. an electronic token ("token").

Customers may request that administrators of a transaction account issue a token account linked to the customer's transaction account. The token may allow the administrator to digitally transfer a virtual payment mechanism for a limited authorized monetary amount that is available for a defined duration. Typical tokens provide a low level of sophistication and control to spending and reconciliation. In this regard, tokens typically act as only an identifier of the transaction account, allowing merchants to link the token transaction to the main transaction account, and therefore, only provide a limited fraud control utility to customers.

SUMMARY

In various embodiments, systems, methods, and articles of manufacture (collectively, the "system") for customer defined limited use authorization are disclosed. The system may receive an identification credential from at least one of an issuer native application ("app") or an issuer web app. The request may be received by a computer based system in communication with a database. The system may receive customer data from the database. The system may determine a valid customer identity in response to the receiving the identification credentials and the customer data. The system may receive a request to generate a token from a customer via at least one of the issuer web app or the issuer native app. The request may comprise the identification credential or a parent transaction account and at least one of a customer defined authorization control or a customer defined generation control. The system may generate the token in response to the valid customer identity and the request to generate a token or the customer defined generation control. The system may generate the token via a tokenization engine. The token may comprise a token ID and the customer defined authorization control. The system may store a token data in the database. The system may associate the limited use authorization token to the parent PAN in response to generating the token. The association may be a function of the token data and the customer data.

In various embodiments, the customer defined authorization control may comprise at least one of a date range, a time range, an authorized variance, a geographical limitation, a merchant limitation, a single use limitation, a multi-use limitation, a declining balance limitation, a transaction amount, or a transaction channel. In various embodiments, the customer defined generation control comprises at least one of a date range, a date horizon, a time horizon, or a geofenced generation control. In various embodiments, the system may transmit the token to at least one of a customer terminal or a customer mobile device. The system may store the token in a wallet of the issuer native app in response to the transmitting the token.

In various embodiments, the system may also transmit the token in response to a generation control condition in accordance with the customer defined generation control. The system may transmit the token via the tokenization engine. The system may also receive a payment authorization request. The payment authorization request may comprise the token ID. The system may also reconcile the payment authorization request to the parent transaction account.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide a greater level of sophistication and control for customer-defined fraud control. Prior art systems typically generate one token per customer request, the system may generate multiple tokens per request. The system may allow for the generation of more token accounts (e.g., 100 times more) per a parent PAN. In this regard, the system may also avoid increasing the cost of development for increasing the number of available token account numbers by not requiring additional hardware development. The system may reduce the risk of fraud associated with token transactions by generating a token comprising customer defined authorization controls, intelligent supplier analytic controls, and/or enhanced client data records. The system may also reduce the risk of fraud associated with token transactions by restricting all token transactions and generation to a parent transaction account and within an issuer network and validated merchant system instead of providing the token to merchants via third party users or allowing a third party token generation. The system may simplify reconciliation of token transactions and improve tracking of transaction related data by providing a unique token transaction ID to each transaction while also handling within the issuer system the overall group of token transactions to provide tracking for the parent transaction account. Benefits of the present disclosure may apply to any suitable use of all types of tokens (electronic or otherwise). For example, the present disclosure may apply in corporate contexts, as well as in consumer use of all types of tokens.

Figure 1:
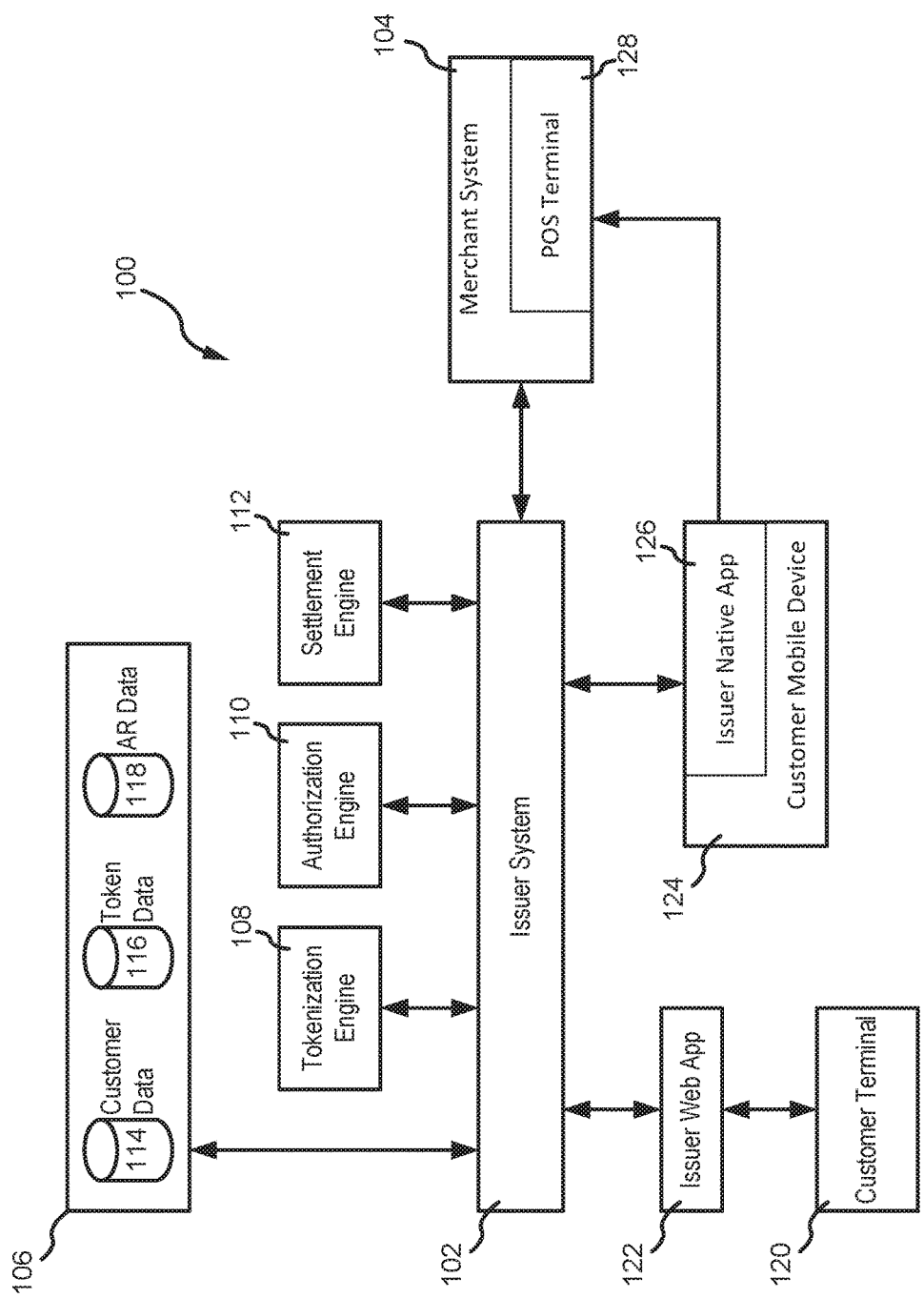
FIG. 1 is a block diagram illustrating various system components of a system for customer defined limited use authorization, in accordance with various embodiments.

In various embodiments, and with reference to FIG. 1, a system 100 may comprise an issuer system 102, a merchant system 104, a customer terminal 120, and a customer mobile device 124. In various embodiments, issuer system 102 may further comprise a database 106, a tokenization engine 108, an authorization engine 110, a settlement engine 112, an issuer web app 122, and an issuer native app 126. Any of these components may be outsourced and/or be in communication with issuer system 102. In various embodiments, database 106 may comprise any number of data elements or data structures such as customer data 114, token data 116, and accounts receivable ("AR") data 118. Merchant system 104 may comprise a point-of-sale ("POS") terminal 128 which may include software and/or hardware. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

This process improves the functioning of the computer. For example, by tending to decrease interfaces with external data stores or third party networks customer identification may be expedited. Similarly, the process may tend to increase the reliability and speed of customer validation by enabling an array of customer identity credentials for comparison and by tending to decrease validation interfaces with third party networks. In various embodiments, a one-to-one tie is enabled between the customer of a financial institution and the account issued by the financial institution which increases the reliability and speed of customer validation and of transaction routing. Additionally, by transmitting, storing, and accessing data using the processes described herein, the security of the data is improved and fraud is reduced, which decreases the risk of the computer or network from being compromised and may tend to increase the efficiency of the network by reducing the portion of transaction volume comprising fraudulent transactions.

In various embodiments, customer terminal 120 may comprise hardware and/or software configured to allow a customer, administrator, parent transaction account owner, and/or the like, access to system 100. For example, customer terminal 120 may comprise any suitable device that is configured to allow a user to communicate with a network and issuer system 102 via an issuer web app 112. Customer terminal 120 may include, for example, a personal computer, personal digital assistant, cellular phone, kiosk, and/or the like. Customer terminal 120 may allow a user to communicate with issuer system 102 to setup tokens, request to generate tokens, review parent transaction account history, review token transaction history, and/or any other suitable task. Customer terminal 120 may be in electronic and/or operative communication with issuer system 102. In this regard, customer terminal 120 may comprise any suitable hardware and/or software components capable of sending and receiving data, for example a personal computer. In various embodiments, customer terminal 120 may be configured to communicate, via issuer web app 112, with a customer mobile device 124 comprising an issuer native app 126. In various embodiments, customer terminal 120 may be configured to transmit a token to customer mobile device 124.

In various embodiments, issuer system 102 may be configured as a central network element or hub to access various systems, engines, and components of system 100. Issuer system 102 may comprise a network, computer-based system, and/or software components configured to provide an access point to various systems, engines, and components. Issuer system 102 may be in operative and/or electronic communication with customer terminal 120, tokenization engine 108, authorization engine 110, settlement engine 112, customer mobile device 124, database 106, and/or merchant system 104. In this regard, issuer system 102 may allow communication from customer terminal 120 to systems, engines, and components of system 100. Issuer system 102 may also allow communication from merchant system 104 to systems, engines, and components of system 100. In various embodiments, issuer system 102 may receive device fingerprinting data from customer mobile device 124 and customer terminal 120. In various embodiments, device fingerprinting data may be supplied by issuer native app 126 or issuer web app 112.

In various embodiments, tokenization engine 108 may be configured to generate a token. Tokenization engine 108 may generate a token in response to a customer request. In various embodiments, a customer may initiate a token request process from customer terminal 120 within issuer web app 122. In various embodiments, a customer may initiate a token request process from customer mobile device 124 within issuer native app 126. Tokenization engine 108 may receive a request to generate a token from issuer web app 122 or from issuer native app 126, via issuer system 102. Tokenization engine 108 may also be configured to transmit the token. For example, tokenization engine 108 may transmit the generated token to customer mobile device 124 or to customer terminal 120. Tokenization engine 108 may comprise and incorporate hardware and/or software components configured to generate and transmit the token. Tokenization engine 108 may be in operative and/or electronic communication with issuer system 102, database 106, authorization engine 110, settlement engine 112, and/or customer mobile device 124.

In various embodiments, authorization engine 110 may incorporate various hardware and/or software components. Authorization engine 110 may be in operative and/or electronic communication with issuer system 102 and database 106. Authorization engine 110 may be configured to authorize and/or decline a transaction authorization request from merchant system 106 in response to receiving a token. Authorization engine 110 may communicate with database 106 to store and maintain data on authorized transactions as account receivable (AR) data 118.

In various embodiments, settlement engine 112 may be configured to process transaction information. Settlement engine 112 may process payment information by communicating with database 106 to recall AR data 118 on authorized transactions for a parent transaction account. Settlement engine 112 may also, in response to a successful payment transaction, send a transaction confirmation to merchant system 104, via issuer system 102, notifying a merchant of a successful payment transaction. Settlement engine 112 may be in operative and/or electronic communication with issuer system 102, database 106, authorization engine 110, settlement engine 112, and/or customer mobile device 124.

In various embodiments, database 106 may be configured to store and maintain transaction data relating to parent transaction accounts and tokens as AR data 118. For example, AR data 118 may comprise transaction data such as the parent transaction account ID, token IDs, transaction history, pending transactions, and/or the like. Database 106 may store the AR data 118 using any suitable technique described herein or known in the art. AR data 118 may be in operative and/or electronic communication with tokenization engine 108, authorization engine 110, and/or settlement engine 112.

In various embodiments, database 106 may be configured to store and maintain token data 116 relating to parent transaction accounts. Token data 116 may comprise data such as token IDs, validity status, parent transaction accounts, customer defined authorization controls, and/or issuer defined authorization controls. In various embodiments, token data 116 may be written to database 106 in response to at least one of a token request process, an authorization process, or a settlement process. Token data 116 may be in operative and/or electronic communication with tokenization engine 108, authorization engine 110, settlement engine 112, issuer web application 122, and/or issuer native app 126.

In various embodiments, database 106 may be configured to store and maintain data on parent transaction account subscribers or customers as customer data 114. In this regard, customer data 114 may comprise one or more user profiles, linking a user to the parent transaction account. For example, a user profile may comprise various profile indicia, such as parent transaction account information (e.g., a PAN), associated user accounts, user account access data (e.g., username, password, and/or the like), associated tokens and token IDs, and/or other such similar data. Customer data 114 may be stored in database 106 using any suitable technique described herein or known in the art. Customer data 114 may be in operative and/or electronic communication with tokenization engine 108, authorization engine 1110, settlement engine 112, issuer web application 122, and/or issuer native app 126.

In various embodiments, customer mobile device 124 may be configured to receive a token. In various embodiments, configuring customer mobile device 124 to receive the token may comprise installing issuer native app 126. In this regard, customer mobile device 124 may be in operative and/or electronic communication with tokenization engine 108, and may receive the token from tokenization engine 108 in response to a token request from issuer native app 126 and/or issuer web app 122. In various embodiments, customer mobile device 124 may receive a token from customer terminal 122 and comprise a mechanism allowing customer terminal 122 to transmit the token such as, for example, a QR code reader which may comprise an element of issuer native app 126. In this regard, customer mobile device 124 may comprise any suitable hardware and/or software components capable of sending and receiving data. For example, customer mobile device 124 may comprise a personal digital assistant, cellular phone, smart watch, and/or the like. Customer mobile device 124 may also comprise a near-field communication (NFC) enabled device, such as a smartphone (e.g., IPHONE®, BLACKBERRY®, and/or the like), a smart-ring, and/or the like. In various embodiments, Customer mobile device 124 may also comprise a mechanism allowing a merchant to access and use the token in a transaction. Customer mobile device 124 may also be configured to store the token in the issuer native app 126 in response to receiving the token from the issuer system 102. In various embodiments, issuer native app 126 may pass the token to a third party wallet application such as, for example, Apple Pay®.

In various embodiments, issuer native app 126 may be configured to run on customer mobile device 124 and may comprise a user interface configured to allow a customer to authenticate a customer identity via one or more customer identity controls. Issuer native app 126 may further comprise the user interface configured to allow a customer to define one or more authorization controls encoded into a token. In various embodiments, a customer identity control may comprise at least one of a password, a fingerprint ID, a facial ID, and or other biometric identifying information. In various embodiments, a customer defined authorization control may comprise at least one of a transaction dollar amount, a use control (e.g., single use or multiple uses), a time window, a date window, a geographic area, a payment channel, or a merchant. In various embodiments, issuer native app 126 may communicate with a POS terminal 128 to transmit a token via the POS terminal 128 to merchant system 104.

In various embodiments, merchant system 104 may incorporate hardware and/or software components. Merchant system 104 may be configured to enable a merchant to receive a payment from a user, and submit a request to authorize the payment. Merchant system 104 may comprise a POS terminal 128 configured as a mechanism to conduct a transaction. In this regard, POS terminal 128 may enable a customer to initiate a transaction with a merchant. For example, POS terminal 128 may comprise a cashier station, a credit or debit card reader, and/or the like. POS terminal 128 may also comprise a near-field communication (NFC) terminal. In this regard, an NFC terminal may allow for the transfer of information to another NFC enabling device, for example a mobile device such as customer mobile device 124. In various embodiments, POS terminal 128 may allow a customer to pay a merchant using a token stored on an NFC enabled mobile device (i.e., customer mobile device 124). In various embodiments, the transfer of information between the customer mobile device 124 and the POS terminal 128 may be a one way communication to transmit the token from the issuer native app 126. In various embodiments, the transfer of information may be a two way communication comprising a token receipt message from the POS terminal 128 to issuer native app 126 via the customer mobile device 124. In various embodiments, POS terminal 126 and/or merchant system 104 may confirm receipt of the token to issuer system 102.

In response to a user initiating a transaction with a merchant through POS terminal 128, via issuer native app 126, for example, the merchant may send a transaction authorization request for the token to authorization engine 110, via issuer system 102. In various embodiments, POS terminal 128 may enable system 100 without the need for specialized software and/or hardware. In various embodiments, POS terminal 128 may also be equipped and configured with specialized software and/or hardware to further enable system 100. The transaction authorization request may comprise transaction identification information, which may be standardized codes or numbers indicating the characteristics of the transaction (e.g., a merchant category code (MCC), a service establishment number, geographic location code, product code, POS terminal number, and/or the like), a transaction request amount, a transaction date and/or a user profile identifier such as the token ID (or a transaction account number, a user account, a customer account number, and/or any other identifying information).

Figure 2:
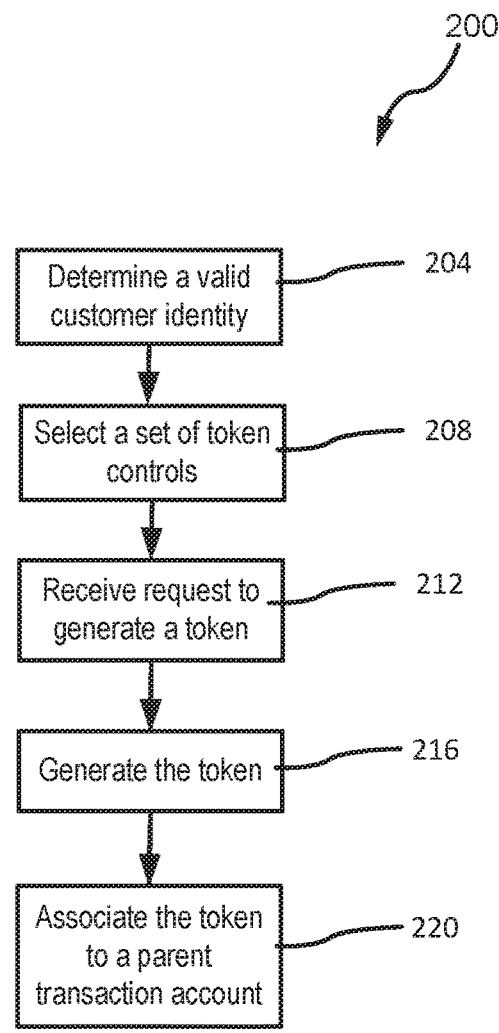
FIG. 2 illustrates a process flow for generating customer defined limited use authorization token, in accordance with various embodiments.

In various embodiments, and with reference to FIG. 2, a method 200 for generating a token is disclosed. Method 200 may allow a customer to request to generate a token linked to a parent transaction account. Method 200 may also allow the customer to request to generate the token having a customer defined authorization control, an intelligent supplier analytic control, and/or an enhanced client data record, among other suitable controls, parameters, and/or the like. In this regard, method 200 may enable a greater level of sophistication and control of token accounts, and the generation of tokens having a decreased risk of fraud.

In various embodiments, method 200 may comprise issuer system 102 receiving the request to generate the token from at least one of the issuer web app 122 or issuer native app 126 (Step 212). In this regard, a customer may input the request to generate the token into customer terminal 120 or customer mobile device 124. In various embodiments, customer mobile device 124 may be configured for input of the request to generate a token by installing issuer native app 126. The user may input the request into customer terminal 120 or customer mobile device 124 via a web page, batch file, web service, API, and/or through any other suitable method.

The request may comprise the parent transaction account from which to link the token, and a token balance. For example, the parent transaction account may comprise the transaction account that will be billed for any transaction from the token. Issuer web app 122 and/or issuer native app 126 may prompt the user to select the parent transaction account from a list of potential or available transaction accounts (e.g., a customer PAN, a bank account, a gift card account, or other third party account etc.). For example, issuer web app 122 and/or issuer native app 126 may require the user to enter identification credentials (such as a username, password, biometric information and/or the like) to access the parent transaction account, prior to requesting generation of the token. In various embodiments, and in response to receiving the identification credentials, the issuer system 102 may compare the identification credentials received from at least one of issuer native app 126 or issuer web app 122 with customer data 114 and determine a valid customer identity (step 204). Upon determining a valid identity, issuer system 102 allows the selected parent transaction account to be enabled for association with a token when the token is requested. In this regard, fraud may be reduced by enabling a token request only upon determination of the valid customer identity and by the determining a valid customer identity within the issuer system 102.

In various embodiments, method 200 may further comprise selecting a set of token controls comprising customer defined authorization controls and/or customer defined generation controls (step 208). In various embodiments, the request of step 212 may also comprise one or more customer defined authorization controls for the token. Issuer web app 122 and/or issuer native app 126 may prompt the customer to input one or more customer defined authorization controls for the token. The customer defined authorization controls may comprise a control and/or limitation on the token to generate a token if specific generation criteria are met, to decline a transaction if specific criteria are not met, and/or to authorize a transaction if specific criteria are met. In this regard, a customer defined authorization control may be used to reduce fraud on the token and provide a customer a particularized level of fraud control tailored to a discrete transaction or a set of discrete transactions. In this regard, the authorization control may be linked to the token, and not directly to the parent transaction account (e.g., the authorization control may not affect the parent transaction account; only the token).

In various embodiments, a customer defined authorization control may comprise a token balance such as the authorized monetary value of the token (e.g., $100.00, $50.00, $1000.00, and/or any other suitable value). In various embodiments, a token comprising a token balance may be re-used up to the balance (i.e., a multi-use token expiring once the balance is drawn down) or may be a single use token (i.e., expiring after a single use irrespective of balance remaining). In various embodiments, a customer defined authorization control may comprise a date window or date range, limiting the dates that the token may be used (e.g., the date range of Jan. 5, 2018 to Jan. 12, 2018, a specific date of Jan. 13, 2018, and/or any other suitable time period). In that regard, the authorization control of the date range may comprise a start date (e.g., Jan. 5, 2018) and an end date (e.g., Jan. 12, 2018). The authorization control may further comprise a time zone to provide greater accuracy as to the date range. In like regard, a customer defined authorization control may comprise a time window or time range, limiting the time that the token may be used (e.g., a time window between 0900 GMT to 1700 GMT or duration of less than 4 hours from the time of generation). In that regard, the customer defined authorization control of the time window may comprise a start time (e.g., 0900 GMT) and an end time (e.g., 1700 GMT) or a duration (e.g., a number of minutes, hours, days etc.). In various embodiments, a customer defined authorization control may comprise a combination of date and time controls such as, for example, a recurring, shifting, or sliding time window over a period of days (e.g., the date range of Jan. 5, 2018 to Jan. 12, 2018 between 0900 GMT to 1700 GMT).

In various embodiments, the customer defined authorization control may also comprise a mobile alert indicator. In that regard, the mobile alert indicator may enable a text message, e-mail, and/or the like, to be sent to a user in response to a transaction being authorized on the token. The customer defined authorization control may also comprise a geographical limitation (e.g., the token is only authorized for use in Utah), a merchant limitation (e.g., the token is only authorized for use for a specified merchant ID), a merchant category limitation (e.g., the token is only authorized for use for a specified merchant category code (MCC), such as a department store or a grocery store), a single use limitation (e.g., the token expires after a single transaction, regardless of remaining token balance), a multi-use limitation (e.g., the token expires after a set number of transactions, regardless of remaining token balance), a declining balance limitation (e.g., the token does not expire after a single transaction, but instead the token balance declines after each authorized transaction), and/or any other suitable limitation or control. In various embodiments, a geographical limitation may be enabled by location data which may be obtained from the customer mobile device 124 by issuer native app 126 via onboard sensors such as, for example, GPS, accelerometers, or other location service data. In various embodiments, a merchant category limitation may be enabled by MCC data or product ID/SKU data which may be provided by merchant system 104 to issuer system. In various embodiments, a set of authorization controls may be developed by a machine learning technique such as, for example, one of a supervised deep learning technique or an unsupervised deep learning technique, and presented via the user interface to a user within the issuer native app 126 or the issuer web app 122 which may be automatically applied if approved.

In various embodiments, the customer defined authorization control may also comprise an authorized variance, allowing the token to authorize a monetary transaction higher than the token balance. For example the authorized variance may comprise a percent of the token balance (e.g., the authorized variance of 10% on a token balance of $100.00 would allow authorizations up to $110.00), or authorized variance may also comprise a monetary value (e.g., the authorized variance of $10.00 on a token balance of $100.00 would allow authorizations up to $110.00). In various embodiments, the authorized variance may be a function of a parent transaction account balance. In various embodiments, the authorized variance may also vary by state (e.g., tokens for use in the state of California comprise the authorized variance of 8%, and tokens for use in the state of Utah comprise the authorized variance of 5%). In various embodiments, an authorized variance may be defined by any suitable rule derived from a set of financial information linked to the account.

In various embodiments, the request of step 212 may also comprise an intelligent supplier analytic control for the token. Issuer web app 122 and/or issuer native app 126 may prompt the user to select an intelligent supplier analytic control for the token. In this regard, the intelligent supplier analytic control may be linked to the token, and not to the parent transaction account (e.g., the intelligent supplier analytic control may not affect the parent transaction account; only the token). The intelligent supplier analytic control may comprise any suitable controls on the token to inhibit and/or allow transactions on the token.

The intelligent supplier analytic control may comprise an intelligent merchant control. The intelligent merchant control may enable a token transaction to be authorized and/or declined, via authorization engine 110, based on the merchant conducting the transaction. For example, the token may be used to reserve a hotel room at some desired time interval; before the reservation date. In response to the hotel room having a transaction cost of $400.00, the token may be generated with a token balance of $400.00. However, the hotel may desire to periodically check the token before the reservation date to ensure that the token is still active. A typical practice may be for the hotel to authorize $1.00 on the token to ensure that the token is not expired. The hotel may attempt this authorization every few days, every week or month, and/or at any other desirable interval leading up to the reservation date. In response to the numerous $1.00 authorizations, the token may decline the hotel room transaction (e.g., the numerous $1.00 authorizations added with the $400.00 room transaction cost are greater than the $400.00 token balance). The intelligent merchant control may recognize that the merchant is a hotel (through a merchant ID, the merchant category code (MCC), and/or other similar type of identifier), and disregard the $1.00 authorizations to enable the $400.00 transaction to be approved. Moreover, the intelligent merchant control may recognize that the merchant is a hotel, and approve the numerous $1.00 authorizations, regardless of whether those authorizations take place outside of an approved date range (e.g., the token is approved only for Jan. 1, 2016 to Jan. 15, 2016, but the authorizations take place during December 2015). In various embodiments, the token may comprise a token threshold limit, such as, for example, $1.00, $2.00, and/or any other suitable value, wherein any authorized transaction having an amount less than the token threshold limit may not impact the preauthorized amount.

The intelligent supplier analytic control may also comprise an intelligent authorization control. The intelligent authorization control may work in conjunction with the authorization control on the token. For example, the token may comprise an authorization control restricting the use of the token to gas and/or fuel transactions. The intelligent authorization control may enable system 100 to recognize whether the token transaction is for gas and/or fuel, and decline the transaction in response to the token transaction not matching the authorized control. In that regard, system 100 may recognize that the transaction is for gas and/or fuel via the merchant ID and/or the merchant category code (MCC) and/or by a product ID such as, for example, a SKU which may be provided by merchant system 104.

In various embodiments, the request of step 212 may also comprise an enhanced client data record for the token. Issuer web app 122 and/or issuer native app 126 may prompt the customer to include custom data of the customer's choosing, which may be reconciled with settlement records, and/or the like, and returned to the customer. The enhanced client data record can be used to create new intelligent authorization controls, intelligent supplier analytic controls, and/or reconciliation business logic. The customer may also choose to create business logic triggered by the return of the enhanced client data record coupled with date from the token transaction. For example, when a token is requested, the customer may include a tax ID code indicating charitable expenditures. Any transaction settled with that token may be returned to the customer (e.g., by e-mail, text message, via issuer native app 126, and/or issuer web app 122) with the tax id code and based on a combination of the token and tax ID code, the user could automatically (e.g., by machine recognition algorithm or the like as a function of the returned data) indicate a charitable tax reduction within their internal financial system. The enhanced client data record may also enable support and reconciliation for legal, accounting, and/or other similar types of compliance. The enhanced client data record may be linked to the token (e.g., the enhanced client data record may not affect the parent transaction account; only the token) and/or the parent transaction account. The enhanced client data record may comprise metadata, and/or the like, aiding in the reconciliation of the token after an authorized transaction. For example, the enhanced client data record may comprise an identifier, such as an employee ID, employee name, family member name, and/or the like. In this regard, the enhanced client data record may aid in reconciliation by providing data on the individual that is using the token. The enhanced client data record may also comprise an accounting code, a tax code, a purchase order identifier (e.g., a purchase order ID, a purchase order number, and/or the like), a unique identifier (e.g., a record ID), and/or any other suitable and/or desired identifying data. Since any type of data can be associated to the token, a myriad of valuable controls may be enabled. For example, rules may be created to send text notifications in response to the token being settled at a specific merchant (via the merchant ID) or exceeding a specific dollar amount. For more information regarding tokens having enhanced client data records, see U.S. patent application Ser. No. 15/144,479 filed May 2, 2016 and entitled "Systems and Methods for Control and Reconciliation of Virtual Token Accounts", which is hereby incorporated by reference in its entirety for all purposes.

In various embodiments, the request of step 212 may also comprise one or more customer defined generation controls for the token. Issuer web app 122 and/or issuer native app 126 may prompt the customer to input one or more customer defined generation controls for the token. In various embodiments, a customer defined generation control may comprise a date horizon or date range, defining a date or dates that one or more tokens may be generated (e.g., the date range of Jan. 5, 2018 to Jan. 12, 2018 over which one or more tokens may be generated, a specific date of Jan. 13, 2018 on which one or more tokens may be generated, and/or any other suitable time period). In that regard, the generation control of the date range may comprise a start date (e.g., Jan. 5, 2018) and an end date (e.g., Jan. 12, 2018) or a discreet date. The generation control may further comprise a time zone to provide greater accuracy as to the date range. In like regard, a customer defined generation control may comprise a time horizon, defining the time that the token may be generated (e.g., generate at 0900 GMT or after an elapsed time of 4 hours from the time of request). In that regard, the customer defined generation control of the time horizon may comprise a discreet time horizon (e.g., 0900 GMT) or a set of time horizons (e.g., 0900 GMT, 1200 GMT, and 1700 GMT) or a duration (e.g., a number of minutes, hours, days etc.). In various embodiments, a customer defined generation control may comprise a combination of date and time controls such as, for example, a recurring or a slide time horizon over a period of days (e.g., the date range of Jan. 5, 2018 to Jan. 10, 2018 at 0900 GMT, 1200 GMT, and 1700 GMT) which may, for example, take the form of "generate three (3) tokens per day for five (5) days." In various embodiments, a customer defined generation control may comprise a geographical area or location and, in this regard, a customer defined generation control may be a geofenced generation control. For example, the token is only generated when the issuer native app 126 receives location data from customer mobile device 124 indicating that the customer mobile device 124 has crossed a geographic boundary (e.g., located in Utah) or is in proximity to a geographic location (e.g., near a supermarket or other merchant location).

In various embodiments, step 212 may also comprise transmitting the request to generate the token, via issuer system 102, to tokenization engine 108. In various embodiments, the request may be implemented via an API and/or through any other suitable method. In this regard, data regarding the parent transaction account and the token balance, and the customer defined authorization control, the intelligent supplier analytic control, and/or the enhanced client data record may also be transmitted to tokenization engine 132. In various embodiments, the request to generate the token may be transmitted in response to a customer defined generation control. In this regard, a customer defined generation control may pre-generate a token for later transmission to issuer native app 126 once the customer defined generation control condition is met.

In various embodiments, method 200 may comprise generating the token (step 216). The system may receive, by tokenization engine 108, the request to generate the token from one of the issuer web app 122 or the issuer native app 126. The token may be generated by tokenization engine 108 in response to receiving the request to generate the token. In this regard, tokenization engine 108 may generate the token to comprise the token balance and a token ID. Tokenization engine 108 may also generate the token to comprise at least one of the customer defined authorization control, the intelligent supplier analytic control, and/or the enhanced client data record. Tokenization engine 108 may also generate the token to have any other suitable types of data, parameters, limitations, and/or the like. The token may comprise a single use token (e.g., the token may only be used once), a multi-use token (e.g., the token may be used as many times as desired), a travel token wherein the value of the token is refreshed during any suitable time interval (e.g., daily, weekly, etc.), and/or the like.

In various embodiments, method 200 may comprise associating the token to the parent transaction account (step 220). Tokenization engine 108 may communicate with database 106 to retrieve customer data 114 comprising data on the parent transaction account. Tokenization engine 108 may communicate with database 106 via a web page, batch file, web service, API, and/or through any other suitable method. Tokenization engine 108 may associate the token to the parent transaction account, in response to tokenization engine 108 generating the token, through the use of an identifier (i.e. a token ID), such as metadata and/or the like (e.g., metadata comprising the parent transaction account number, and/or the like). Similarly and in various embodiments, step 216 may further comprise tokenization engine 108 associating the token with the selected set of token controls, such as the customer defined authorization controls, as metadata regarding the generated token in database 106 as elements of token data 116. In various embodiments, the token may be associated with the token data 116 comprising the set of token controls by the token ID. In this regard, an expanded set of token controls are enabled without increasing the file size of the token. Stated another way, the token may comprise the token ID and the customer defined authorization control which may be associated (as a function of token data 116 and the token ID) with the token as an extended data set. In various embodiments, the token data 116 may be stored in conjunction or relationally with regard to customer data 114 on the parent transaction account, such that the stored data on the token is linked to the associated parent transaction account. Stated another way, the association of the token to the parent transaction account may be a function of the token data 116 and the customer data 114.

Figure 3:
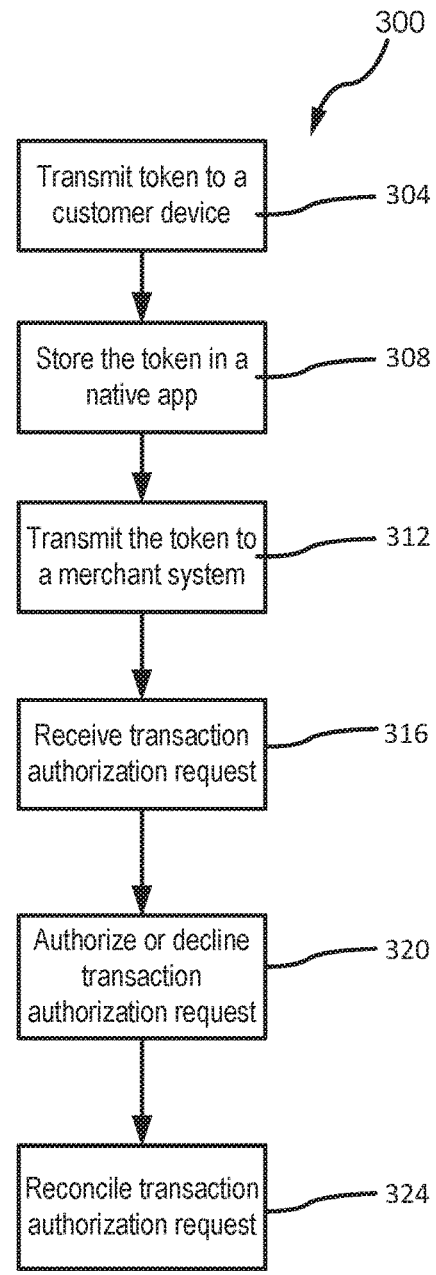
FIG. 3 illustrates a process flow for authorizing a token transaction request, in accordance with various embodiments.

In various embodiments, and with reference to FIG. 3, a method 300 for authorizing a token payment request is disclosed. Method 300 may enable the authorization of tokens having a customer defined authorization control, an intelligent supplier analytic control, and/or an enhanced client data record, among other suitable controls, parameters, and/or the like. In this regard, method 300 may enable control and reconciliation over token accounts and transactions.

In various embodiments, method 300 may comprise transmitting the token (step 304) to the issuer native app 126. Tokenization engine 108 may transmit the token in real-time, near real-time, and/or at any other suitable time. In various embodiments, tokenization engine 108 may transmit the token in response to the request to generate a token. In various embodiments, tokenization engine 108 may transmit the token in response to the request to receive the token and the customer defined generation control. Tokenization engine 108 may also transmit the token via any suitable channel, such as, for example, e-mail, fax, web service, mobile device, file transfer, and/or the like. Tokenization engine 108 may transmit the token to customer mobile device 124, after the token has been generated (e.g., step 220). Tokenization engine 108 may transmit the token to customer mobile device 124 corresponding to a customer defined generation control in the issuer native app 126 request to generate the token. In various embodiments, tokenization engine 108 may transmit the token to the issuer web app 122 and, in response to receiving the token, issuer web app 122 may cause issuer native app 122 to prompt the customer to transmit the token from the issuer web app 122 to the issuer native app 126. Issuer native app 126 may receive the token, and in response to receiving the token, store the token using any suitable technique (step 308). Method 300 may further comprise transmitting the token from the native app 126 to the merchant system 104 via the POS terminal 128 (step 312). In various embodiments, issuer native app 126 may transmit the token in response to the customer purchasing an item.

In various embodiments, method 300 may comprise receiving a transaction authorization request (step 316) from a merchant system 104. In this regard, a customer may use the token contained in issuer native app 126 on customer mobile device 124 to complete a transaction with a merchant, via POS terminal 128 of merchant system 104. Merchant system 104 may transmit the transaction authorization request to authorization engine 110, via issuer system 102. Authorization engine 110 may receive the transaction authorization request, and may call corresponding token account information from database 106, such as token data 116 or customer data 114, linked to the transaction authorization request. In this regard, authorization engine 110 may retrieve the token ID from the transaction authorization request, and retrieve token data 116 from database 106.

In various embodiments, method 300 may comprise authorizing or declining the transaction authorization request (step 320). Authorization engine 110 may compare the transaction request amount to the token balance. In response to the transaction request amount being greater than the token balance, authorization engine 110 may decline the transaction authorization request. In response to the transaction request amount being less than or equal to the token balance, authorization engine 110 may authorize the transaction authorization request.

Authorization engine 110 may also compare the transaction authorization request with the customer defined authorization control and/or the intelligent supplier analytics control. In response to the transaction authorization request not meeting the customer defined authorization control and/or intelligent supplier analytics control, authorization engine 110 may decline the transaction authorization request. For example, if the transaction authorization request comprises a transaction date of Jan. 1, 2018 and the token comprises an authorization control date range of Dec. 1, 2017 to Dec. 15, 2017, or if, for example the transaction authorization request comprises a first MCC (e.g., a gas station) and the token comprises a customer defined authorization control comprising a second MCC (e.g., a grocery store), or if, for example, the transaction authorization request comprises a first transaction channel (e.g., an online payment channel) and the token comprises a customer defined authorization control comprising a second transaction channel (e.g., a retail channel), in any of these instances authorization engine 110 would decline the transaction authorization request. In that regard, authorization engine 110 may transmit to merchant system 104, via issuer system 102, a notification of the denial and thereby tend to allow the customer to define a limited use transaction authorization. In response to the transaction authorization request meeting the authorization control and/or intelligent supplier analytics control, authorization engine 110 may authorize the transaction authorization request. For example, if the transaction authorization request comprises a merchant ID indicating that the merchant is in California, and the token comprises an authorization control geographical limitation of California, authorization engine 110 would authorize the transaction authorization request. In that regard, authorization engine 110 may transmit to merchant system 160 a notification of the authorization. Authorization engine 110 may also transmit data to database 106 as AR data 118 regarding the accepted transaction. In various embodiments, authorization engine 110 may also be configured to transmit a notification (such as an e-mail, text message, or the like) to the customer terminal 120, the issuer native app 126, and/or the customer mobile device 124, via issuer system 102, notifying that the token was authorized for the transaction authorization request.

In various embodiments, method 300 may comprise reconciling the transaction authorization request (step 324). Authorization engine 110 may reconcile the transaction authorization request in response to approving the transaction authorization request in step 320. Authorization engine 110 may communicate with settlement engine 112, via issuer system 102, to settle the authorized token transaction. Settlement engine 112 may communicate with accounts database 106 to retrieve data, such as AR data 118, regarding the transaction. Settlement engine 112 may also communicate with database 106 to settle the authorized token amount against the parent transaction account. Settlement engine 112 may retrieve token data 116 comprising the enhanced client data records from the token to further reconcile the authorized token transaction. In this regard, the enhanced client data records on the token may enable settlement engine 112 to more accurately reconcile the transaction authorization request by matching the enhanced client data records of the token to the enhanced client data records as selected when the customer requested to generate the token within at least one of the issuer web app 122 or the issuer native app 126.

In various embodiments, issuer system 102 may transmit, via e-mail, text message, and/or the like, to customer terminal 120, issuer web app 122, customer mobile device 124, and/or issuer native app 126, a transaction history report. The transaction history report may comprise data on token transactions. In this regard, the transaction history report may comprise data on the enhanced client data records for each token transaction. The transaction history report comprising data on the enhanced client data records may further enable a customer, via system 100, to reconcile token transactions. For example, the transaction history report may comprise token transactions grouped by the customer identifier, the purchase order, the merchant class, the tax code, the accounting code, and/or other similar groupings.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The terms "payment vehicle," "transaction account", "financial transaction instrument," "transaction instrument" and/or the plural form of these terms may be used interchangeably throughout to refer to a financial instrument. Phrases and terms similar to "transaction account" may include any account that may be used to facilitate a financial transaction Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account. In various embodiments, an account number may identify a consumer. In addition, in various embodiments, a consumer may be identified by a variety of identifiers, including, for example, an e-mail address, a telephone number, a cookie id, a radio frequency identifier (RFID), a biometric, and the like.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

""Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/ or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In Re Nuijten* to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    determining, by a computer based system, a valid customer identity of a customer based on an identification credential matching customer data from a database;
    implementing, by the computer based system, a customer defined generation control associated with a parent transaction account, wherein the customer defined generation control indicates a generation control condition upon which an electronic payment token is authorized to be generated by the customer, wherein the generation control condition specifies at least a time of day range and a geofenced boundary for which the electronic payment token is authorized to be generated and transmitted to a customer mobile device;
    receiving, by the computer based system, a request to generate the electronic payment token from at least one of an issuer web app or an issuer native app, wherein the request comprises at least an identification of the parent transaction account of the customer, a monetary value of the electronic payment token, and a customer defined authorization control,
    wherein the customer defined authorization control defines a condition upon which an electronic payment token is authorized by the customer as a payment in a transaction, wherein the customer defined authorization control includes a transaction amount limit;
    receiving, by the computer based system, global positioning location data from the customer mobile device;
    verifying, by the computer based system, the global positioning location data as satisfying the generation control condition by evaluating a proximity of the global positioning location data from the customer mobile device against the geofenced boundary for the generation control condition;
    receiving, by the computer based system, a current time of day corresponding to the global positioning location data from the customer mobile device;
    verifying, by the computer based system, the current time of day as satisfying the time of day range by evaluating the current time of day against the time of day range for the generation control condition;
    generating, by the computer based system and via a tokenization engine, the electronic payment token in response to the valid customer identity and the request to generate the electronic payment token, wherein the electronic payment token comprises a token identification (ID) and the customer defined authorization control encoded in the electronic payment token;
    associating, by the computer based system, the electronic payment token to the parent transaction account of the customer;
    transmitting, by the computer based system and via the tokenization engine, the electronic payment token to the customer mobile device responsive to the generation control condition being satisfied; and
    reconciling, by the computer based system, a payment authorization request to the parent transaction account responsive to the condition defined in the customer defined authorization control being satisfied, wherein the payment authorization request comprises the token ID and a transaction amount.

2. The method of claim 1, wherein the customer defined authorization control further comprises at least one of a date range, an authorized variance, a merchant limitation, a single use limitation, a multi-use limitation, a declining balance limitation, or a transaction channel.

3. The method of claim 1, wherein the customer defined generation control comprises at least one of a date range or a date horizon control.

4. The method of claim 1, wherein generating the electronic payment token further comprises storing, by the computer based system and via the tokenization engine, an expanded set of token controls comprising the customer defined authorization control as token data and associating the token data to the electronic payment token based on the token ID.

5. A system comprising:
a processor,
a tangible, non-transitory memory configured to communicate with the processor,
the tangible, non-transitory memory having instructions stored thereon that, in response to execution by the processor, cause the processor to perform operations comprising:
determining a valid customer identity of a customer based on an identification credential matching customer data from a database;
implementing a customer defined generation control associated with a parent transaction account, wherein the customer defined generation control indicates a generation control condition upon which an electronic payment token is authorized to be generated by the customer, wherein the generation control condition specifies at least a time of day range and a geofenced boundary for which the electronic payment token is authorized to be generated;
receiving a request to generate the electronic payment token from at least one of an issuer web app or an issuer native app, wherein the request comprises at least an identification of the parent transaction account of the customer, a monetary value of the electronic payment token, and a customer defined authorization control,
wherein the customer defined authorization control defines a condition upon which an electronic payment token is authorized by the customer as a payment in a transaction, wherein the customer defined authorization control includes a transaction amount limit;
receiving global positioning location data from a customer mobile device;
verifying the global positioning location data as satisfying the generation control condition by evaluating a proximity of the global positioning location data from the customer mobile device against the geofenced boundary for the generation control condition;
receiving a current time of day corresponding to the global positioning location data from the customer mobile device;
verifying the current time of day as satisfying the time of day range by evaluating the current time of day against the time of day range for the generation control condition;
generating the electronic payment token in response to the valid customer identity and the request to generate the electronic payment token, wherein the electronic payment token comprises a token identification (ID) and the customer defined authorization control encoded in the electronic payment token;
associating the electronic payment token to the parent transaction account of the customer;
transmitting the electronic payment token to the customer mobile device after the generation control condition is satisfied; and
reconciling a payment authorization request to the parent transaction account responsive to the condition defined in the customer defined authorization control being satisfied, wherein the payment authorization request comprises the token ID and a transaction amount.

6. The system of claim 5, wherein the customer defined authorization control further comprises at least one of a date range, an authorized variance, a merchant limitation, a single use limitation, a multi-use limitation, a declining balance limitation, or a transaction channel,
wherein the generating of the electronic payment token further comprises storing an expanded set of token controls comprising the customer defined authorization control as token data and associating the token data to the electronic payment token based on the token ID.

7. The system of claim 5, wherein the customer defined generation control further comprises at least one of a date range or a date horizon control.

8. An article of manufacture including a non-transitory, tangible computer readable storage medium having instructions stored thereon that, in response to execution by a computer based system, cause the computer based system to perform operations comprising:
determining a valid customer identity of a customer based on an identification credential matching customer data from a database;
implementing a customer defined generation control associated with a parent transaction account, wherein the customer defined generation control indicates a generation control condition upon which an electronic payment token is authorized to be generated by the customer, wherein the generation control condition specifies at least a time of day range and a geofenced boundary for which the electronic payment token is authorized to be generated;
receiving a request to generate the electronic payment token from at least one of an issuer web app or an issuer native app, wherein the request comprises at least an identification of the parent transaction account of the customer, a monetary value of the electronic payment token, and a customer defined authorization control,
wherein the customer defined authorization control defines a condition upon which an electronic payment token is authorized by the customer as a payment in a transaction, wherein the customer defined authorization control includes a transaction amount limit;
receiving global positioning location data from a customer mobile device;
verifying the global positioning location data as satisfying the generation control condition by evaluating a proximity of the global positioning location data from the customer mobile device against the geofenced boundary for the generation control condition;
receiving, by the computer based system, a current time of day corresponding to the global positioning location data from the customer mobile device;

verifying the current time of day as satisfying the time of day range by evaluating the current time of day against the time of day range for the generation control condition;

generating the electronic payment token in response to the valid customer identity and the request to generate the electronic payment token, wherein the electronic payment token comprises a token identification (ID) and the customer defined authorization control encoded in the electronic payment token;

associating the electronic payment token to the parent transaction account;

transmitting the electronic payment token to the customer mobile device after the generation control condition is satisfied; and reconciling a payment authorization request to the parent transaction account responsive to the condition defined in the customer defined authorization control being satisfied, wherein the payment authorization request comprises the token ID and a transaction amount.

9. The article of manufacture of claim 8, wherein the customer defined authorization control further comprises at least one of a date range, an authorized variance, a merchant limitation, a single use limitation, a declining balance limitation, or a transaction channel.

10. The article of manufacture of claim 8, wherein the customer defined generation control further comprises at least one of a date range or a date horizon control.

11. The method of claim 1, wherein the customer defined authorization control further comprises a date range for which the electronic payment token is authorized to be used as the payment of the transaction.

12. The system of claim 5, wherein the customer defined authorization control further comprises a date range for which the electronic payment token is authorized to be used as the payment of the transaction.

13. The method of claim 1, wherein the customer defined authorization control further comprises a specification of a merchant and a specification of a geographical location for the merchant for which the electronic payment token is authorized to be used as the payment of the transaction.

14. The system of claim 5, wherein generating the electronic payment token further comprises storing an expanded set of token controls comprising the customer defined authorization control as token data and associating the token data to the electronic payment token based on the token ID.

15. The system of claim 5, wherein the customer defined authorization control further comprises a specification of a merchant and a specification of a geographical location for the merchant for which the electronic payment token is authorized to be used as the payment of the transaction.

16. The system of claim 5, wherein the location data is obtained from a GPS sensor or an accelerometer sensor of the customer mobile device.

17. The article of manufacture of claim 8, wherein generating the electronic payment token further comprises storing an expanded set of token controls comprising the customer defined authorization control as token data and associating the token data to the electronic payment token based on the token ID.

18. The article of manufacture of claim 8, wherein the customer defined authorization control further comprises a date range for which the electronic payment token is authorized to be used as the payment of the transaction.

19. The article of manufacture of claim 8, wherein the customer defined authorization control further comprises a specification of a merchant and a specification of a geographical location for the merchant for which the electronic payment token is authorized to be used as the payment of the transaction.

* * * * *